May 23, 1939. F. C. LEONARD 2,159,033
FLUID MIXING VALVE
Filed Oct. 31, 1936 2 Sheets-Sheet 1

Inventor
Frederick C. Leonard
By Nathaniel Frucht
Attorney

May 23, 1939.　　　　F. C. LEONARD　　　2,159,033
FLUID MIXING VALVE
Filed Oct. 31, 1936　　　2 Sheets-Sheet 2
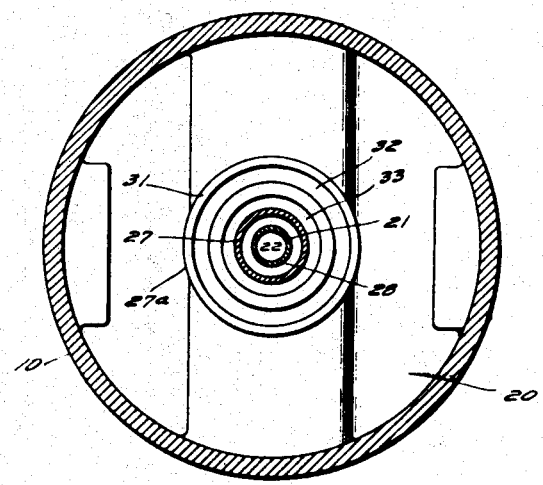
Fig. 4
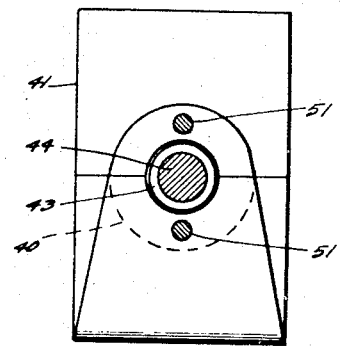
Fig. 5
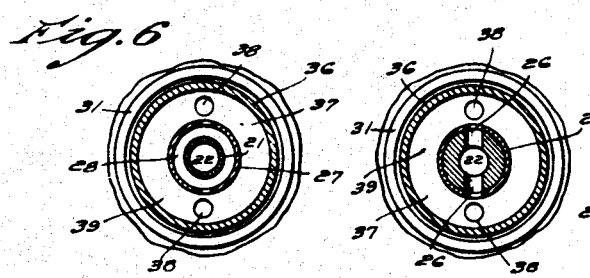
Fig. 6　　Fig. 7
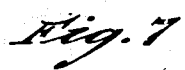
Fig. 8
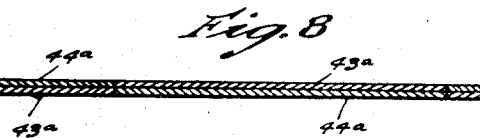
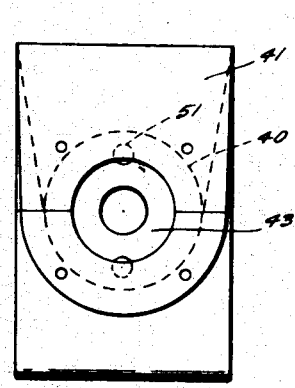
Fig. 9
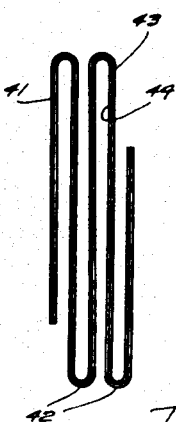
Fig. 10
Inventor
Frederick C. Leonard
By Nathaniel Frucht
Attorney Patented May 23, 1939

2,159,033

UNITED STATES PATENT OFFICE 2,159,033

FLUID MIXING VALVE

Frederick C. Leonard, Cranston, R. I.

Application October 31, 1936, Serial No. 108,527

6 Claims. (Cl. 236—12)

My present invention relates to thermostatic valves, and has particular reference to a novel construction for a mixing valve for hot and cold fluids.

It is the principal object of my invention to provide a very simple and effective valve arrangement for controlling the relative amounts of hot and cold fluid in order to obtain a mixed fluid of predetermined temperature.

It is a further object of my invention to utilize a novel construction of thermostatic material, so as to obtain a more effective thermostatic action.

It is another object of my invention to provide a valve construction that includes an automatic shut-off, whereby the entire supply of both hot and cold water may be shut off when desired.

It is an additional object of my invention to provide a simplified construction of parts, for facilitating the manufacture and assembly of the novel mixing valve and reducing the manufacturing cost.

With the above and other objects and advantageous features in view, my invention consists of a novel arrangement of parts more fully disclosed in the detailed description following, in conjunction with the accompanying drawings, and more specifically defined in the claims appended thereto.

In the drawings,

Fig. 4 is a section on the line 4—4 of Fig. 1;

Figure 1:
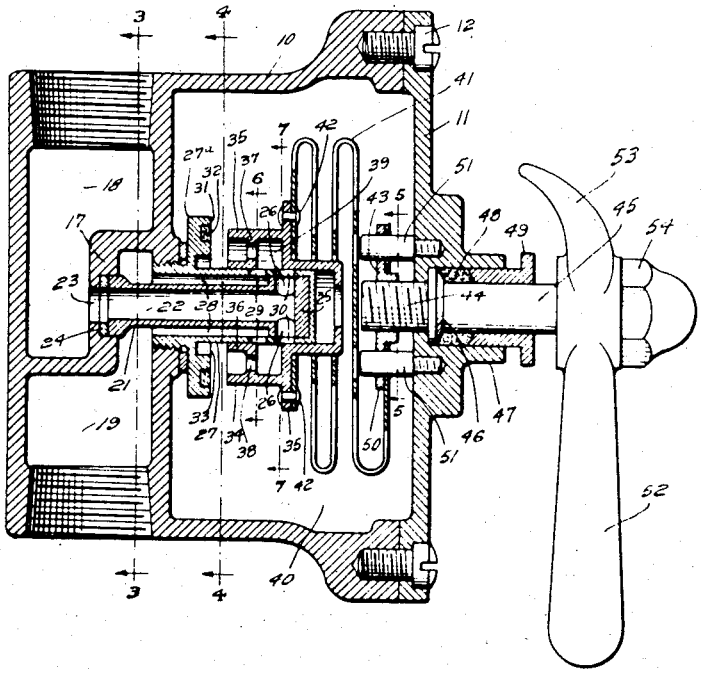
Fig. 1 is a vertical sectional elevation through the novel valve construction.
Figure 2:
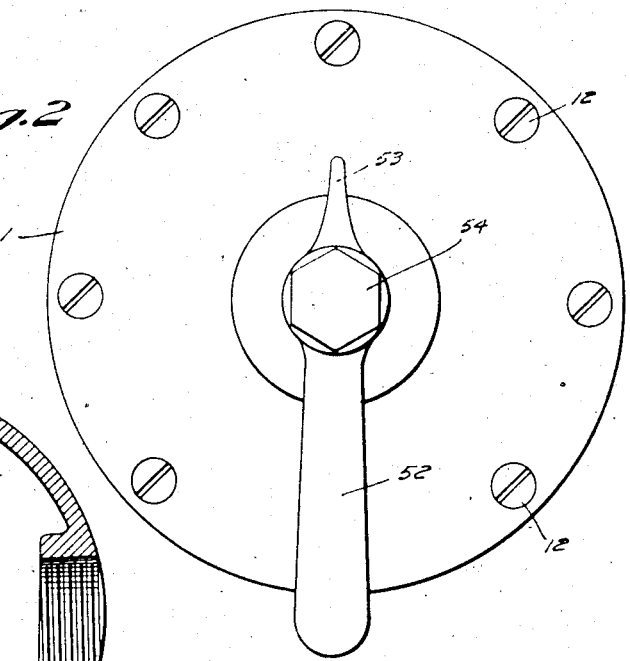
Fig. 2 is a front elevation thereof.
Figure 3:
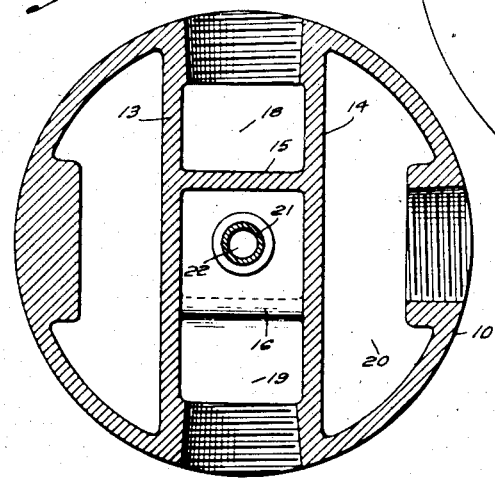
Fig. 3 is a section on the line 3—3 of Fig. 1.

Figs. 5, 6 and 7 are respectively sections on the lines 5—5, 6—6 and 7—7 of Fig. 1;

Fig. 8 is a section through a novel thermostatic strip blank;

Fig. 9 is a front elevation of the novel thermostatic unit formed therefrom; and Fig. 10 is a side view thereof.

Referring to the drawings, the novel valve construction includes a housing 10 on which a cover 11 is detachably mounted, as for example by means of screws 12; the housing 10 including spaced partitions 13 in the lower portion thereof, a transverse partition 14, lateral partitions 15, 16, and Z partition 17, which define an inlet chamber 18 for hot fluid and an inlet chamber 19 for cold fluid, the inlet chambers having the usual threaded pipe receiving openings, and an outlet chamber 20 positioned laterally of the partition 14, and in the same plane as the two inlet chambers, and provided with a standard threaded pipe receiving outlet opening.

Mounted centrally in the central portion of the partition 17, preferably by threaded engagement, is a tubular flow member 21 having a central bore 22 which communicates with the inlet chamber 18 through an opening 23 in the partition 17, a suitable packing 24 being provided between the base of the member 21 and the partition. The member 21 has an end portion 25 extending laterally therefrom which is provided with diametrically opposite outflow openings 26, and a shell 27 is provided, threadedly mounted on the partition 17, with a flange member 27a, this shell being spaced from the tubular member 21 to provide an annular flow passage 28 which communicates at its lower end with the inflow chamber 19; suitable openings 29 and 30 are provided in the upper end of the shell 27, the openings 30 being in communication with the outflow openings 26, and the openings 29 being contiguous thereto and spaced axially therefrom, whereby the valve openings 29 and 30 permit flow of hot and cold fluid therethrough from the inlet chambers into the mixing chamber as hereinafter described. The base of the flange 27a has its upper surface 31 provided with two spaced recesses 32, 33 for the purpose hereinafter described.

Slidably mounted on the upper end of the shell 27 is a reciprocating cylindrical sleeve valve 34, which has an outer flange 35 of annular form and an inner skirt portion 36 secured thereto by a flange 37, which is provided with ports 38, the skirt portion being spaced from the sleeve valve to provide an annular mixing chamber 39 which is in communication with the two sets of ports 29 and 30, whereby reciprocating movements of the valve increases flow through one port and decreases flow through the other; the skirt 36 and the flange 35 are adapted to seat in the recesses 33 and 32, a packing ring being mounted in recess 32 to seal outward fluid flow through the ports 38 when the valve is in its extreme inward position.

The valve 34 is mounted in the upper portion of the housing 10, which is formed as a thermostatic chamber 40 to receive mixed fluid from the mixing chamber through the ports 38, the mixed fluid then passing to the outlet chamber 20; a novel thermostatic element 41 is mounted in the thermostatic chamber with its lower end secured to the valve 34, as by means of rivets 42, the other end of the thermostatic element being secured to a cap 43 which is internally threaded and into which an externally threaded end 44 of a control stem 45 extends. The control stem has a flange 46 which is seated in a boss 47 in the upper end of the cover 11, packing 48 and a gland nut 49 serving to lock the flange 46 against longitudinal movement, but permitting rotation thereof.

The cap 43 has a laterally extending plate member 50 which has spaced openings therethrough, adapted to be mounted on cooperating spaced pins 51 which are threaded so as to depend from the inner surface of the cover 11. A handle 52 of standard form with a pointer arm 53 is mounted on the end of the stem 45 in any desired manner, a preferred construction including a lock nut 54 threadedly engaging a reduced non-circular end of the stem 45 which passes through a similar non-circular opening in the end of the handle 52.

Referring now to Figs. 8 to 10, the thermostatic element 41 consists of a series of U-shaped thermostatic sections 42, each of which consists of an outer layer of metal 43 having a high coefficient of expansion and an inner layer of metal 44 having a relatively low coefficient of expansion, the sections being integrally joined together, as by riveting or by being welded together. A preferred construction includes the positioning of small strips of thermostatic metal in adjacency as shown in Fig. 8, the two metals being alternately reversed as indicated at 43a and 44a, and the strips then being welded together. Since the welding decreases the temper, the composite strip is then rolled, which works the metal so as to increase its elasticity to the desired degree; the thermostatic strip is then bent to the form indicated in Fig. 10, thus obtaining a thermostatic strip of small size having great power in response to temperature change. All the valve parts are preferably of bronze, but may be of other suitable metal.

Referring now to Fig. 1, when the handle 52 is turned a predetermined arc the sleeve 43 is axially shifted to set one end of the thermostat 41, the valve 34 assuming a position so as to permit a controlled flow of hot and cold fluid through the ports 29 and 30. If the temperature of the mixed fluid changes, the thermostat moves so as to increase the amount of one of the fluids and decrease the amount of the other fluid, thus bringing the temperature of the mixed fluid back to its initial value. If the handle 52 be turned back, the sleeve 43 will move downwardly sufficiently to bring the skirt 36 and the flange 35 into the annular recesses 33 and 32, the packing in recess 32 shutting off the supply of fluid to the mixing chamber; the valve 34 also closes the upper port 30 when in this position so as to fully cut off the supply of hot fluid.

While I have described a specific constructional embodiment of my invention, it is evident that changes in the construction of the parts, in the material used, and in the size and relative arrangement of the parts, may be made to suit the requirements for different mixing valves, without departing from the spirit and the scope of the invention as defined in the appended claims.

I claim:

1. In a mixing valve, a housing having an inlet chamber for hot fluid, an inlet chamber for cold fluid, and an outlet chamber for mixed fluid, a member having a bore communicating with one inlet chamber, a shell spaced from said member, the space between said shell and said member communicating with the other inlet chamber, said member and said shell having outflow openings for said bore and said space, a sleeve valve device mounted for reciprocating movement on said shell and movable to control outflow from said openings, and having a mixing chamber for receiving the fluid from said openings, a thermostatic chamber in communication with said mixing chamber and said outlet chamber, and thermostatic means in said thermostatic chamber responsive to change in temperature of the fluid therein to move said valve device.

2. In a mixing valve, a housing having an inlet chamber for hot fluid, an inlet chamber for cold fluid, and an outlet chamber for mixed fluid, a member having a bore communicating with one inlet chamber, a shell spaced from said member, the space between said shell and said member communicating with the other inlet chamber, said member and said shell having outflow openings for said bore and said space, a sleeve valve device mounted for reciprocating movement on said shell and movable to control outflow from said openings, and having a mixing chamber for receiving the fluid from said openings, a thermostatic chamber in communication with said mixing chamber and said outlet chamber, thermostatic means in said thermostatic chamber responsive to change in temperature of the mixed fluid therein to move said valve device, and means for setting said thermostatic means to obtain a predetermined temperature of the mixed fluid.

3. In a mixing valve, a housing having an inlet chamber for hot fluid, an inlet chamber for cold fluid, and an outlet chamber for mixed fluid, a member having a bore communicating with one inlet chamber, a shell spaced from said member, the space between said shell and said member communicating with the other inlet chamber, said member and said shell having outflow openings for said bore and said space, a sleeve valve device mounted for reciprocating movement on said shell and movable to control outflow from said openings, and having a mixing chamber for receiving the fluid from said openings, a thermostatic chamber in communication with said mixing chamber and with said outlet chamber, means for shutting off flow from said mixing chamber to said thermostatic chamber, and thermostatic means in said thermostatic chamber responsive to change in temperature of the fluid therein to move said valve device.

4. In a mixing valve, a housing having an inlet chamber for hot fluid, an inlet chamber for cold fluid, and an outlet chamber for mixed fluid, a member having a bore communicating with one inlet chamber, a shell spaced from said member, the space between said shell and said member communicating with the other inlet chamber, said member and said shell having outflow openings for said bore and said space, a sleeve valve device mounted for reciprocating movement on said shell and movable to control outflow from said openings, and having a mixing chamber for receiving the fluid from said openings, a thermostatic chamber in communication with said mixing chamber and with said outlet chamber, means for shutting off flow from said mixing chamber to said thermostatic chamber, thermostatic means in said thermostatic chamber responsive to change in temperature of the fluid therein to move said valve device, and means for setting said thermostatic means to obtain a predetermined temperature of the mixed fluid.

5. In a mixing valve, a housing having an inlet chamber for hot fluid, an inlet chamber for cold fluid, and an outlet chamber for mixed fluid, a member having a bore communicating with one inlet chamber, a shell spaced from said member, the space between said shell and said member communicating with the other inlet chamber, said member and said shell having outflow openings for said bore and said space, a sleeve valve device mounted for reciprocating movement on said shell and movable to control outflow from said openings, and having a mixing chamber for receiving the fluid from said openings, a thermostatic chamber in communication with said mixing chamber and with said outlet chamber, means for shutting off flow through the hot fluid outflow opening, and thermostatic means in said thermostatic chamber responsive to change in temperature of the fluid therein to move said valve device.

6. In a mixing valve, a housing having an inlet chamber for hot fluid, an inlet chamber for cold fluid, and an outlet chamber for mixed fluid, a member having a bore communicating with one inlet chamber, a shell spaced from said member, the space between said shell and said member communicating with the other inlet chamber, said member and said shell having outflow openings for said bore and said space, a sleeve valve device mounted for reciprocating movement on said shell and movable to control outflow from said openings, and having a mixing chamber for receiving the fluid from said openings, a thermostatic chamber in communication with said mixing chamber and with said outlet chamber, means for shutting off flow through the hot fluid outflow opening, thermostatic means in said thermostatic chamber responsive to change in temperature of the fluid therein to move said valve device, and means for setting said thermostatic means to obtain a predetermined temperature of the mixed fluid.

FREDERICK C. LEONARD.